(12) United States Patent
Richardson

(10) Patent No.: US 7,520,515 B2
(45) Date of Patent: Apr. 21, 2009

(54) STEER AXLE SUSPENSION

(75) Inventor: Gregory Richardson, Muskegon, MI (US)

(73) Assignee: Dana Heavy Vehicle Systems Group LLC, Toledo, OH (US)

( * ) Notice: Subject to any disclaimer, the term of this patent is extended or adjusted under 35 U.S.C. 154(b) by 254 days.

(21) Appl. No.: 10/574,318

(22) PCT Filed: Oct. 1, 2004

(86) PCT No.: PCT/US2004/032194

§ 371 (c)(1),
(2), (4) Date: Mar. 31, 2006

(87) PCT Pub. No.: WO2005/032862

PCT Pub. Date: Apr. 14, 2005

(65) Prior Publication Data

US 2007/0013160 A1 Jan. 18, 2007

Related U.S. Application Data

(60) Provisional application No. 60/507,789, filed on Oct. 1, 2003.

(51) Int. Cl.
*B60G 9/00* (2006.01)
(52) U.S. Cl. .............................................. 280/124.116
(58) Field of Classification Search .......... 280/124.116, 280/124.163, 124.164, 124.165, 124.17, 280/124.171, 124.175
See application file for complete search history.

(56) References Cited

U.S. PATENT DOCUMENTS 2,754,111 A * 7/1956 Norrie ........................ 267/189
3,497,235 A 2/1970 Peer
3,794,130 A 2/1974 Johansson et al.
3,850,445 A * 11/1974 Borns et al. ........... 280/124.163

(Continued)

FOREIGN PATENT DOCUMENTS

DE 23 37 935 2/1975

(Continued)

OTHER PUBLICATIONS

International Search Report issued in PCT/US2004/032194 (Dec. 21, 2004).

(Continued)

*Primary Examiner*—Faye M. Fleming
(74) *Attorney, Agent, or Firm*—Dykema Gossett PLLC

(57) ABSTRACT

A suspension (14) for coupling a steer axle assembly (12) to a vehicle frame (10) is provided that provides lateral stability to the steer axle assembly, increased roll stability for the vehicle and a reduction in axle wind-up during brakingcall without interfering with vertical displacement of the axle assembly. The suspension includes leaf springs (44) disposed on opposite sides of the vehicle, each of which is coupled to the vehicle frame at first and second ends (64, 66) and to an axle beam (28) intermediate the first and second ends. The suspension also includes first and second arms (50, 150), each of which is pivotally coupled to the axle beam at a first end (70, 170) and to the vehicle frame at a second end (68, 168) proximate one of the ends of a corresponding leaf spring. The suspension may further include a torsion bar (52) extending between and coupled to the first and second arms.

23 Claims, 8 Drawing Sheets

U.S. PATENT DOCUMENTS 4,334,697 A * 6/1982 Deweese ............. 280/124.165
5,046,752 A * 9/1991 Stephens et al. ............ 280/678
6,375,203 B1 * 4/2002 Warinner et al. ........... 280/81.6
6,406,007 B1   6/2002 Wilson

FOREIGN PATENT DOCUMENTS

DE        43 34 369    4/1995
FR        21 62 457    7/1973
NL        8 703 122    7/1989

OTHER PUBLICATIONS

Written Opinion issued in PCT/US2004/032194 (Dec. 21, 2004).
English language translation of FR 21 62 457.
English language translation of DE 43 34 369.

* cited by examiner

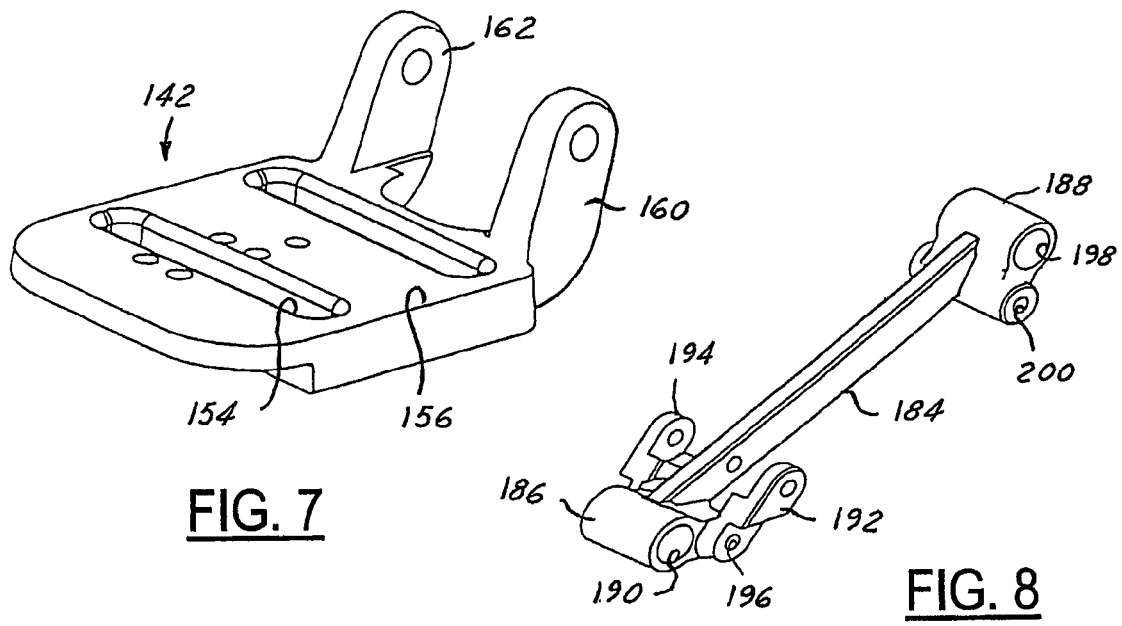
FIG. 7
FIG. 8
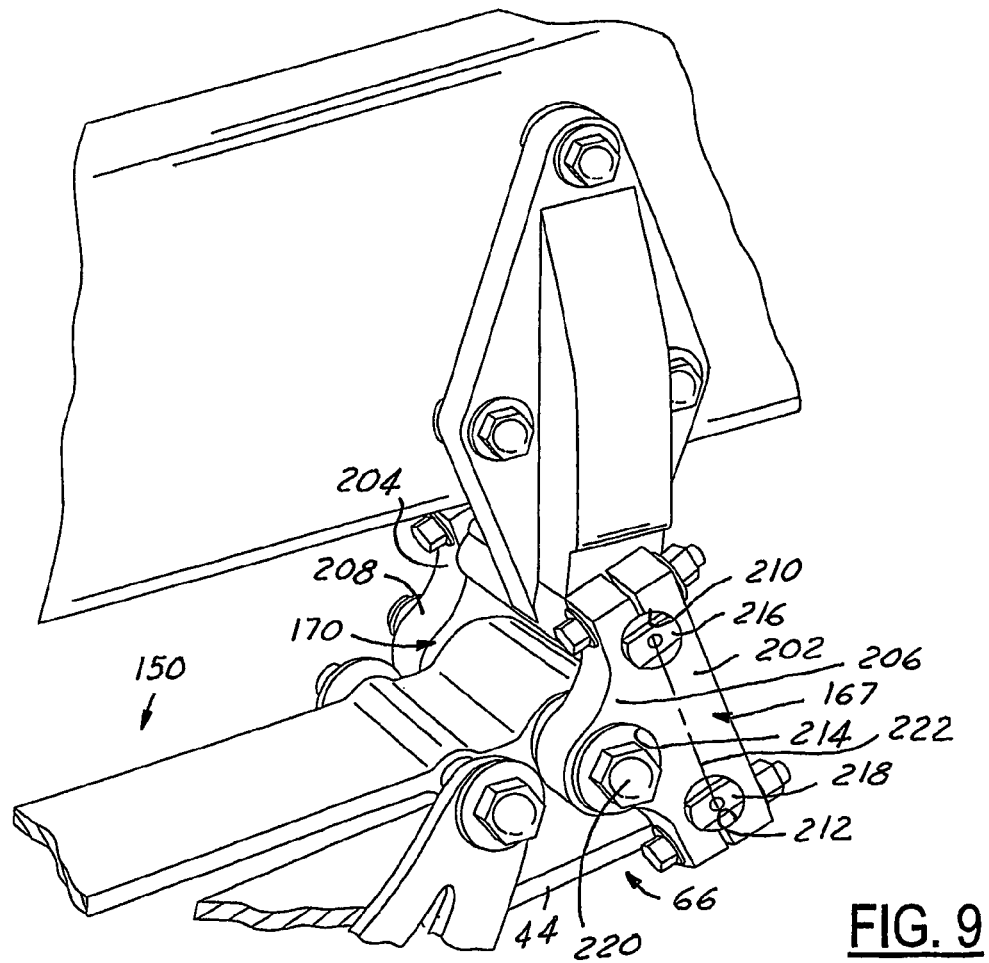
FIG. 9

STEER AXLE SUSPENSION

This application is the national stage application of, and claims priority to, International Application No. PCT/US2004/032194 filed Oct. 1, 2004, the entire disclosure of which is incorporated herein by reference. The International Application was published in the English language on Apr. 14, 2005 as International Publication No. WO 2005/032862 and itself claims the benefit of U.S. Provisional Patent Application No. 60/507,789 filed Oct. 1, 2003, the entire disclosure of which is incorporated herein by reference.

BACKGROUND OF THE INVENTION

1. Field of the Invention

This invention relates to vehicle suspensions and, in particular, to a front suspension for coupling a steer axle assembly to a vehicle frame.

2. Discussion of Related Art

A conventional vehicle includes a vehicle frame having a pair of longitudinally extending frame rails that support the vehicle engine and body. The frame is supported on a plurality of ground-engaging wheels that are disposed at opposite ends of a plurality of axles. The vehicle may contain, for example, a steer axle on which the wheels are steerable by the vehicle operator and a drive axle whose wheels are driven by the vehicle engine. Each of the axles are coupled to the vehicle frame through a suspension that dampens movements transmitted between the wheels and the vehicle frame.

One conventional suspension includes leaf springs disposed on opposite sides of a vehicle with each leaf spring coupled to the vehicle frame at first and second ends and to an axle beam intermediate the first and second ends. This conventional suspension has several disadvantages. During braking, movement of the axle causes the leaf springs to wind up producing a caster change in the axle and a reduction in steering stability. This problem is expected to become greater as mandatory vehicle braking distances are reduced and, consequently, vehicle braking loads increased. Conventional vehicle suspensions must also account for lateral movement of an axle and offer a degree of lateral stability as well as roll stiffness to the vehicle. These objectives are sometimes achieved by using a track or stabilizer bar coupled between the frame and a component of the axle or suspension. These conventional suspensions, however, can interfere with vertical motion of the axle and create additional stress on some suspension components such as the above-mentioned leaf springs.

The inventors herein have recognized a need for a suspension for coupling a steer axle assembly to a vehicle frame that will minimize and/or eliminate one or more of the above-identified deficiencies.

SUMMARY OF THE INVENTION

The present invention provides a suspension for coupling a steer axle assembly to a vehicle frame having first and second longitudinal frame rails.

A suspension in accordance with the present invention includes a first leaf spring coupled to the vehicle frame at first and second ends and to an axle beam of the steer axle assembly intermediate the first and second ends The suspension further includes a first arm pivotally coupled to the axle beam at a first end and to the vehicle frame at a second end proximate one of the first and second ends of the first leaf spring. The suspension also includes a second leaf spring coupled to the vehicle frame at first and second ends and to an axle beam of the steer axle assembly intermediate the first and second ends, the second leaf spring disposed on an opposite side of the vehicle frame from the first leaf spring. The suspension further includes a second arm pivotally coupled to the axle beam at a first end and to the vehicle frame at a second end proximate one of the first and second ends of the second leaf spring. In one embodiment of the invention, the first and second arms are disposed on a forward side of the axle beam relative to the direction of vehicle travel. In another embodiment of the invention, the first and second arms are disposed on a rearward side of the axle beam relative to the direction of vehicle travel. Various embodiments of the invention may also include a torsion bar extending between and coupled to the first and second arms.

A suspension in accordance with the present invention is advantageous. The suspension arms reduce axle wind-up during braking by transferring some of the braking loads into the vehicle frame that would otherwise travel into the leaf springs. The location and mounting of the torsion bar in some embodiments of the invention can also be used to reduce axle wind-up during braking and to provide lateral stability and roll stiffness without interfering with the vertical motion of the axle beam thereby reducing stress on the leaf springs in the suspension.

These and other advantages of this invention will become apparent to one skilled in the art from the following detailed description and the accompanying drawings illustrating features of this invention by way of example.

BRIEF DESCRIPTION OF THE DRAWINGS

FIGS. 7-8 are perspective views of components of the suspension illustrated in FIGS. 4-6.

FIGS. 9-10 are perspective views of a portion of the suspension illustrated in FIGS. 4-6.

DETAILED DESCRIPTION OF EMBODIMENTS OF THE INVENTION

Figure 1:
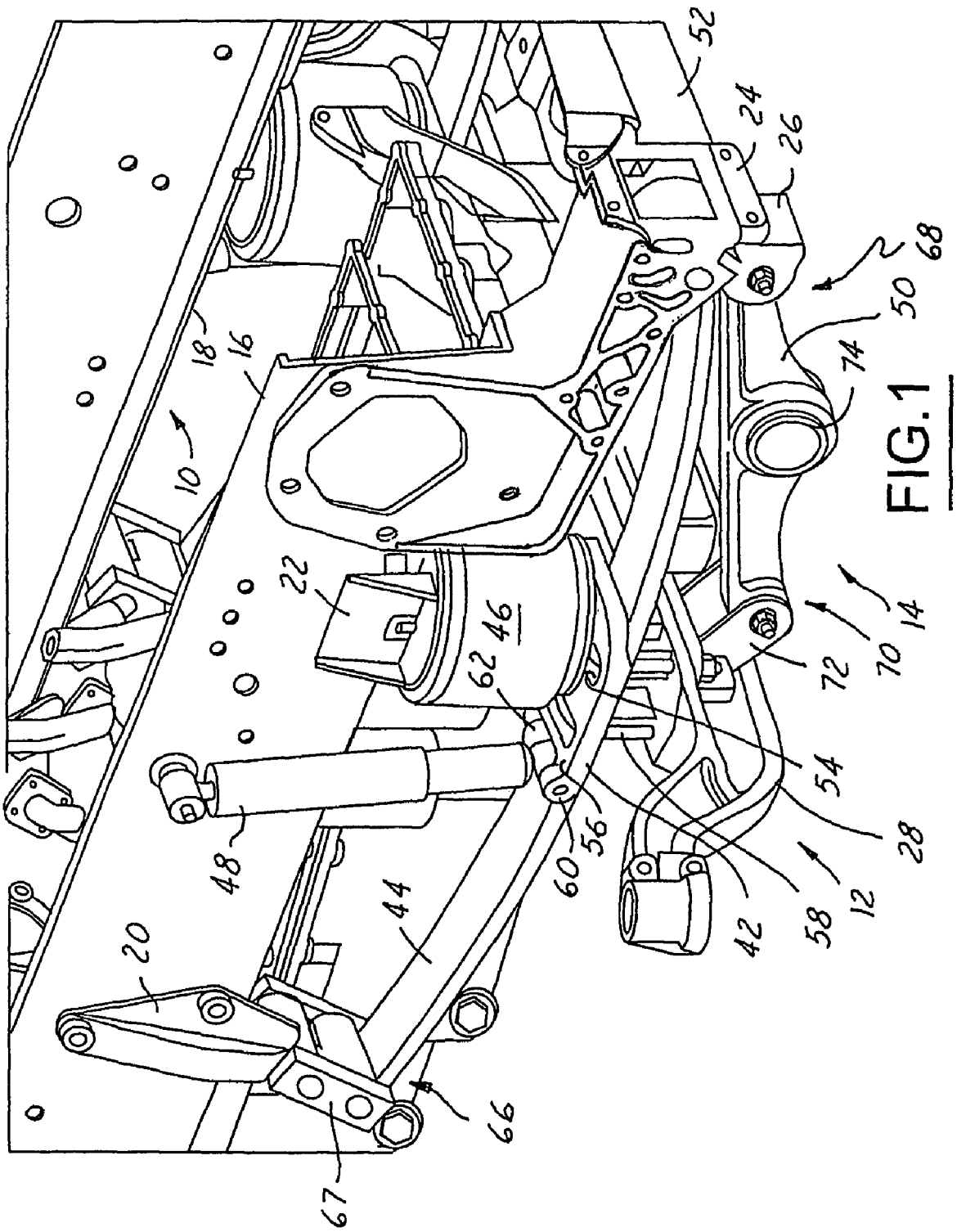
FIGS. 1-3 are perspective views illustrating a portion of a vehicle incorporating a suspension in accordance with one embodiment of the present invention for coupling a steer axle assembly to a frame of the vehicle.
Figure 2:
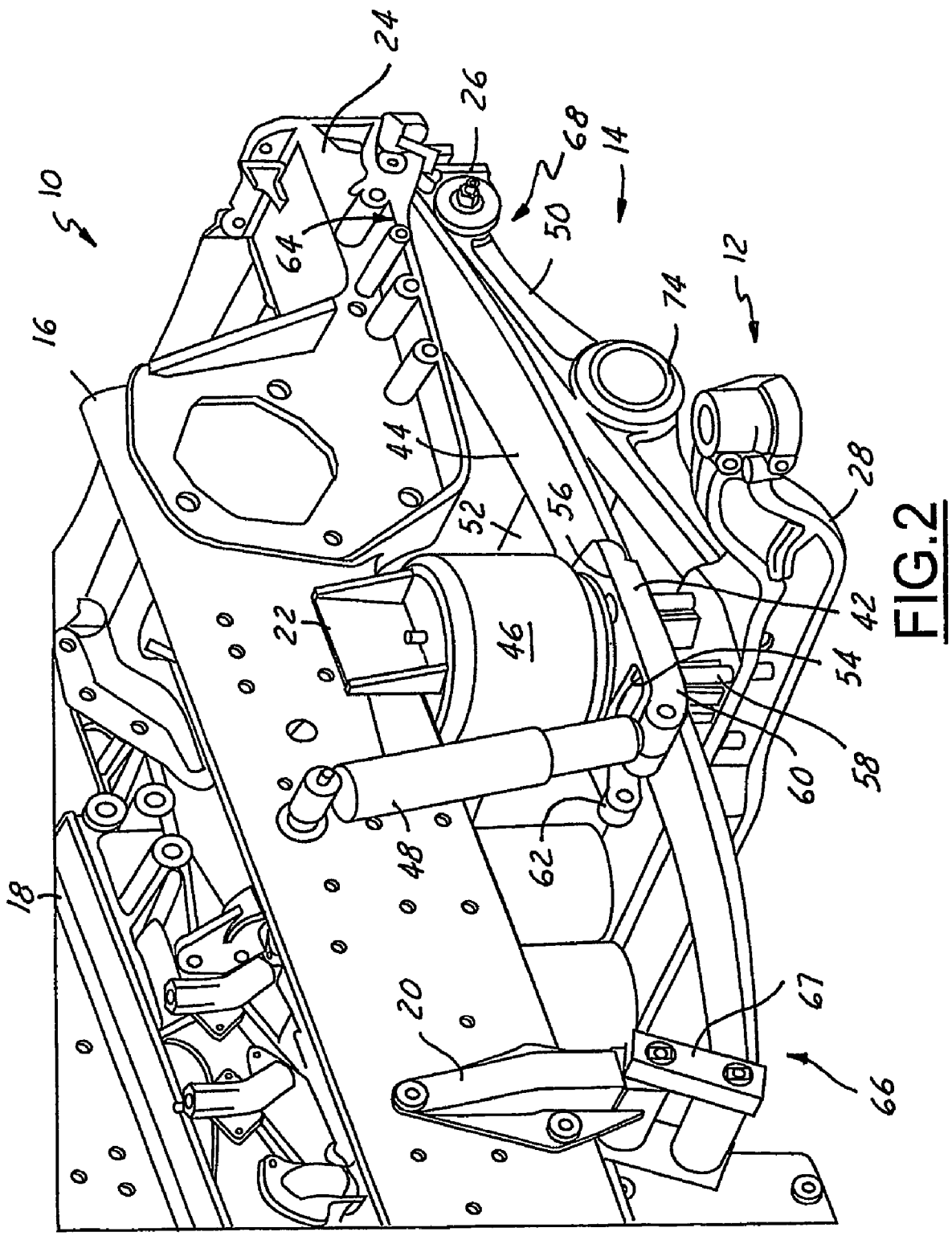

Referring now to the drawings wherein like reference numerals are used to identify identical components in the various views, FIGS. 1 and 2 illustrate a vehicle frame 10 having a steer axle assembly 12 coupled thereto by a suspension 14 in accordance with the present invention. In the illustrated embodiment, frame 10 and steer axle assembly 12 are adapted for use with a heavy truck. It should be understood, however, that the present invention may find application on a wide variety of vehicles.

Frame 10 is provided to support an engine (not shown), cab (not shown) and other components of a heavy truck. Frame 10 is conventional in the art and may be made from conventional metals and metal alloys such as steel. Frame 10 includes a pair of longitudinal rails 16, 18 extending in the direction of vehicle travel and in the longitudinal direction of the vehicle. Frame 10 may also include a plurality of cross-members (not shown) extending transversely between rails 16, 18 and a plurality of mounting brackets including brackets 20, 22, 24, 26.

Rails 16, 18 are provided to secure and align a cab on frame 10 and are conventional in the art. Rails 16, 18 are generally C-shaped in cross-section and open toward one another. Rails 16, 18 may include a plurality of apertures configured to receive bolts, screws, or other fasteners used to secure cross members (not shown), mounting brackets 20, 22, 24, 26 and other vehicle components. The cross-members are provided to connect rails 16, 18 and are conventional in the art. The cross-members may also support various vehicle components including the cab and the vehicle engine Mounting brackets 20, 22, 24, 26 are provided to couple components of suspension 14 to frame 10 and are coupled to frame 10 using conventional fasteners such as screws, bolts, welds, or adhesives. Although only brackets 20, 22, 24, 26 coupled to rail 16 are illustrated in the figures, it should be understood that substantially similar brackets may be found on the opposite of the vehicle coupled to rail 18. It should also be understood that the size, shape, and configuration of brackets 20, 22, 24, 26 will vary depending upon design requirements and parameters associated with frame 10, steer axle assembly 12, and suspension 14 and that variations may be made to brackets 20, 22, 24, 26 without departing from the scope of the present invention.

Bracket 20 is disposed on an outboard side of rail 16 and may be coupled to rail 16 by one more conventional fasteners. Bracket 20 includes a pin proximate its lowermost end for a purpose described hereinbelow.

Bracket 22 may be coupled to rail 16 using conventional fasteners such as welds. Bracket 22 includes a circular plate that defines a spring seat for a purpose described hereinbelow.

Bracket 24 is coupled to rail 16 using conventional fasteners and extends longitudinally forward from the forward end of rail 16. A cross-member is coupled to bracket 24 and a corresponding bracket mounted to rail 18 for use in supporting a vehicle engine. Bracket 24 also defines a pair of downwardly extending spaced ears having aligned apertures for a purpose described hereinbelow.

Bracket 26 is coupled to bracket 24 and is suspended below bracket 24 at a forward end of bracket 24. Bracket 26 also defines a pair of rearwardly extending spaced ears having aligned apertures for a purpose described hereinbelow.

Steer axle assembly 12 supports one or more steerable wheels (not shown) disposed on either side of the vehicle. Assembly 12 may include an axle beam 28, kingpins (not shown) and steering knuckles 30 (one of which is shown in FIGS. 4-6).

Axle beam 28 supports wheels (not shown) disposed proximate either end of beam 28. Beam 28 may be made from conventional metals and metal alloys such as steel and may be forged or fabricated. Beam 28 extends transverse to rails 16, 18 and each end of beam 28 defines a bore that extends generally vertically and substantially perpendicular to the longitudinal axis of beam 28. Each bore is configured to receive a corresponding kingpin.

The kingpins are provided to couple knuckles 30 to beam 28. The kingpins may be made from steel or other conventional metals and metal alloys. Each kingpin may be fixed against rotation within a corresponding bore of axle beam 28 using one or more drawkeys as is conventional in the art. The kingpins are generally circular.

Figure 4:
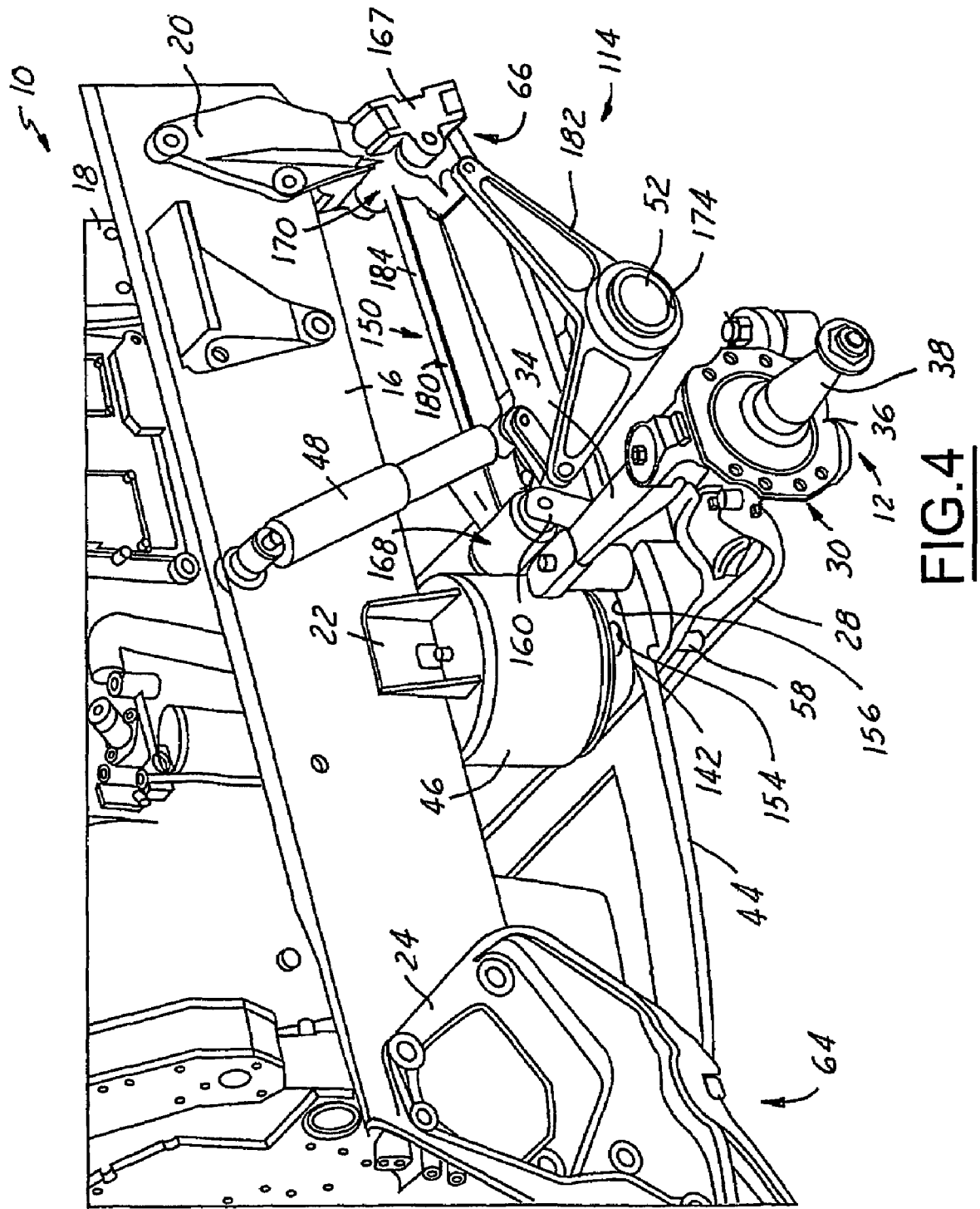
FIGS. 4-6 are perspective views illustrating a portion of a vehicle incorporating a suspension in accordance with another embodiment of the present invention for coupling a steer axle assembly to a frame of the vehicle.
Figure 5:
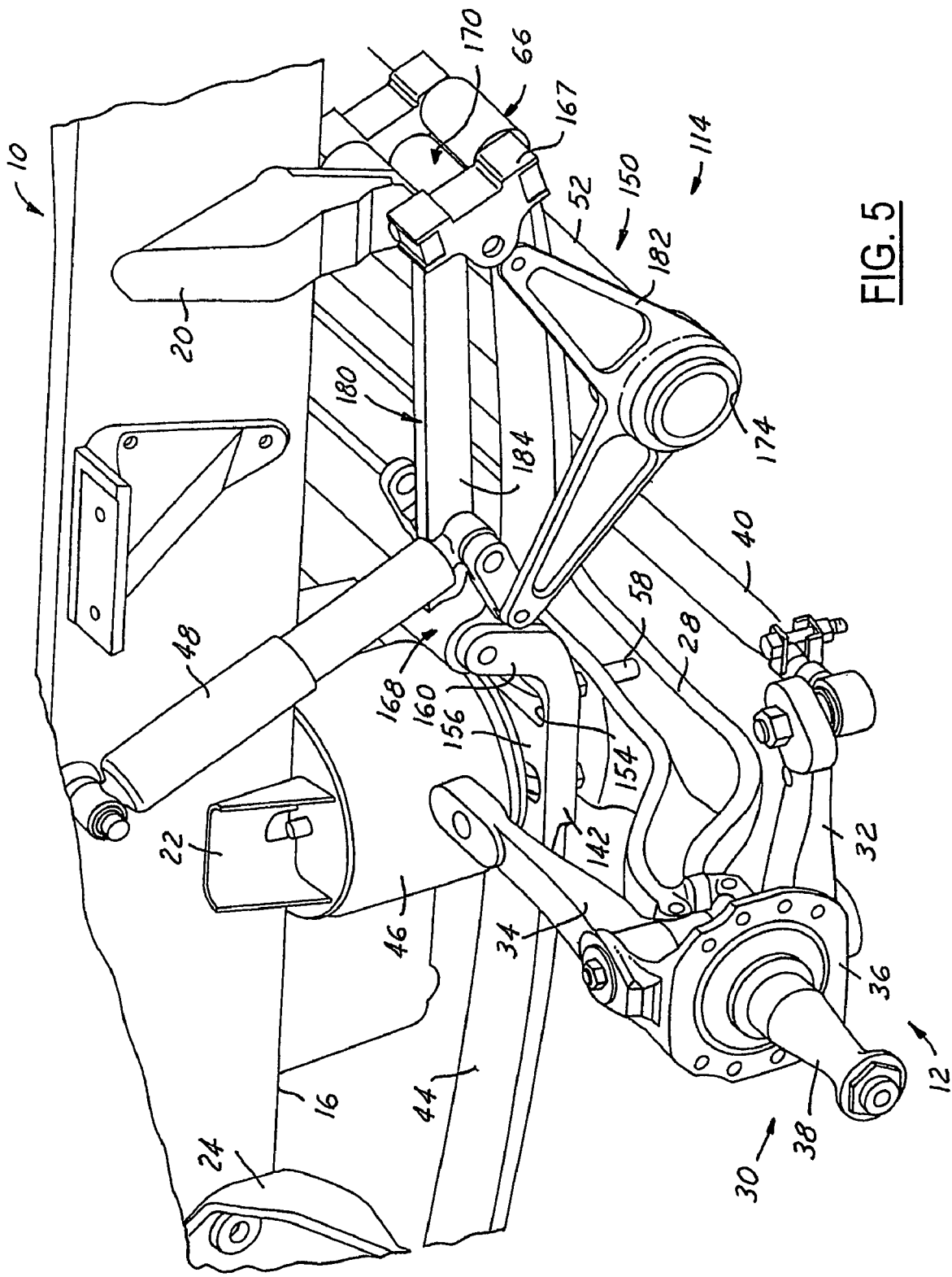
Figure 6:
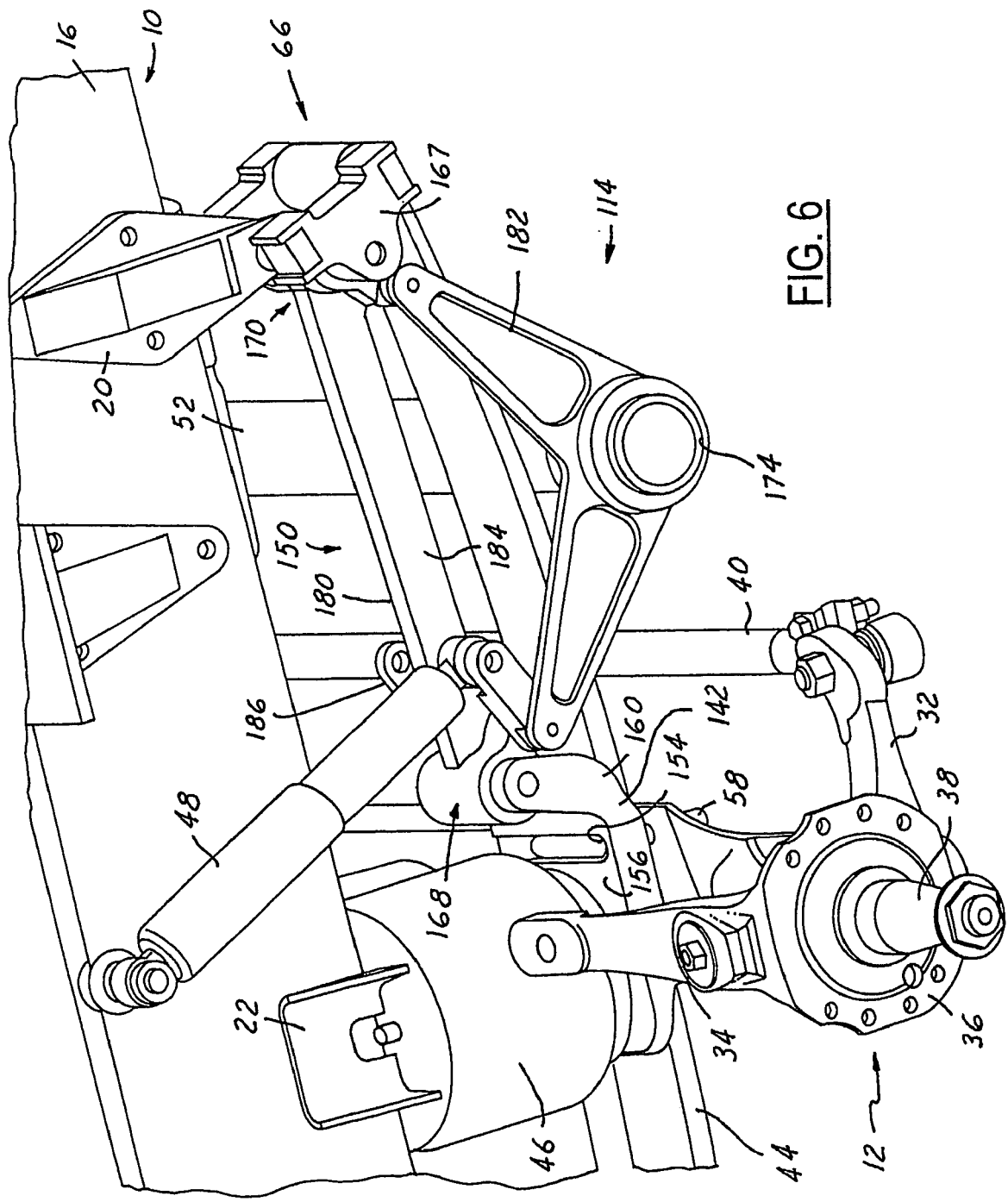

Referring to FIGS. 4-6, knuckles 30 are conventional in the art and are provided for mounting one or more wheels (not shown) of the vehicle and for connecting assembly 12 and a vehicle steering assembly. Knuckles 30 may be made from conventional metals such as aluminum and metal alloys such as steel and may be forged or fabricated. Each knuckle 30 may include a body that defines one or more coaxial bore sized to receive a corresponding kingpin and bearings or a bushing surrounding the kingpin to allow the knuckles 30 to rotate relative to the kingpins. Each knuckle 30 may include a tie rod arm 32 and one knuckle 30 may further include a steering arm 34 as is conventional in the art. Each knuckle 30 may also include a brake mounting plate 36 and a spindle 38 (which may be integral with the knuckle body or coupled thereto) on which wheel bearings (not shown) and one or more wheels (not shown) are mounted.

It should be understood that the steer axle assembly 12 described and illustrated in is exemplary only. The inventive suspension 14 claimed herein may find use on a wide variety of steer axle assemblies. In the steer axle assembly 14 of FIGS. 1-3, axle beam 28 is a conventional I-beam with a gooseneck configuration at either end. Further, each knuckle 30 is a conventional yoke defining coaxial bores on either side of beam 28 for receiving kingpins. Axle beam 28 may alternatively be tubular and/or relatively straight while each of knuckles 30 define a single knuckle boss as described in greater detail in commonly assigned U.S. Pat. No. 6,499,752, the entire disclosure of which is incorporated herein by reference.

A steering assembly (not shown) is provided to enable the vehicle operator to turn the wheels (not shown) supported on knuckles 30. The steering assembly is conventional in the art and may include a steering gear (not shown), a crank (not shown) coupled to the steering gear, a drag-link extending between the crank and steering arm 34 of knuckle 30 and a tie rod 40 extending between tie-rod arms 32 of knuckles 30. The crank rotates responsive to an output shaft extending from the steering gear and causes corresponding movement in the drag link, steering knuckles 30 and tie-rod 40.

Figure 3:
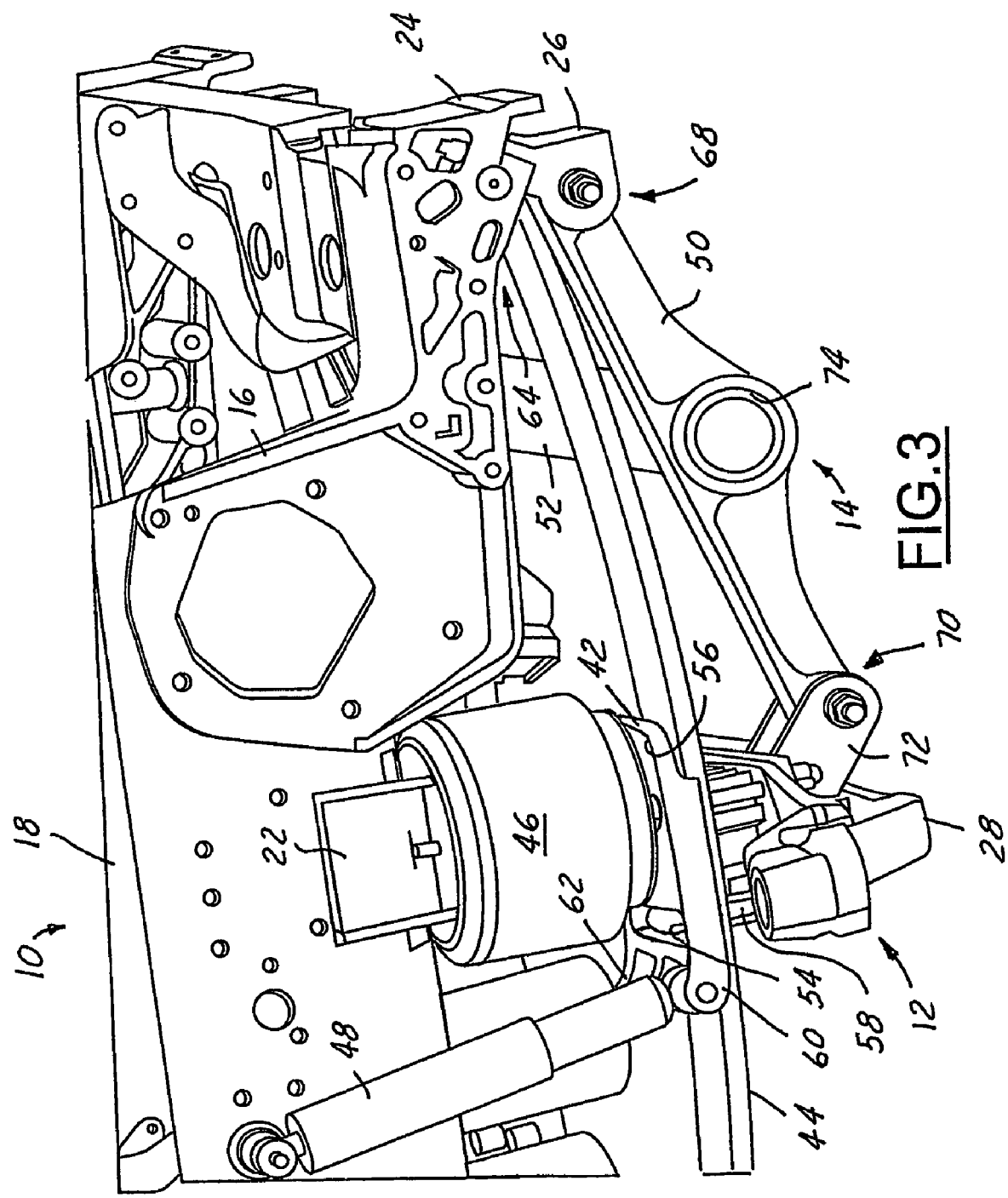

Referring again to FIGS. 1-3, a suspension 14 in accordance with one embodiment of the present invention will be described. Suspension 14 couples steer axle assembly 12 to frame 10. Suspension 14 may include mounting brackets 42, leaf springs 44, air springs 46, shock absorbers 48, mounting arms 50, and a torsion bar 52. Although only one side of the vehicle and suspension 14 are illustrated in FIGS. 1-3, it should be understood that like components for suspension 14 may be found on the opposite side of the vehicle.

Mounting brackets 42 provide a means for mounting one or more suspension components of suspension 14 to axle beam 28 for use in dampening movements between axle assembly 12 and frame 10. Brackets 42 are generally rectangular in shape. Each bracket 42 may define multiple grooves 54 in an upper face 56 of the plate that extend transverse to the longitudinal direction of the vehicle and substantially parallel to the longitudinal direction of axle beam 28. Each groove 54 may terminate at either end in a bore that extends vertically through bracket 42. Grooves 54 are configured to receive conventional U-bolts 58 that extend through the bores in bracket 42 and into corresponding bores on beam 28 to coupled bracket 42 to beam 28. Although each bracket contains two grooves 54 each configured to receive a U-bolt 58, it should be understood that the number of grooves 54 and U-bolts 58 may vary. Each bracket 42 may further define a pair of rearwardly extending spaced ears 60, 62 having coaxial apertures. Ears 60, 62 are sized to receive one eye of a shock absorber 48 with the apertures in ears 60, 62 receiving a pin that extends through the eyelet of shock absorber 48. The upper face 56 of bracket 42 defines a spring seat configured to receive spring 46 and opposing the spring seat formed in mounting bracket 22.

Leaf springs 44 are provided to dampen movement and vibration between frame 10 and steer axle assembly 12. Leaf springs 44 also provide lateral support to the steer axle assembly 12 by transferring lateral loads from the axle beam 28 into mounting brackets 20, 24 of frame 10. Springs 44 are conventional in the art. Each spring 44 extends substantially parallel to rails 16, 18 in the longitudinal direction of the vehicle and is coupled to frame 10 at forward and rearward ends 64, 66 and to beam 28 of steer axle assembly 12 intermediate the forward and rearward ends 64, 66. The forward end 64 is pivotally coupled to bracket 24 and disposed about a pivot axis between the downwardly extending spaced ears at the forward end of bracket 24. The rearward end 66 is coupled to a conventional shackle 67 which is in turn mounted on the pin extending from bracket 20. End 66 is also disposed about a pivot axis. Leaf spring 44 is coupled to beam 28 intermediate ends 64, 66 of leaf spring by bracket 42. In particular, leaf spring 44 is disposed between or sandwiched between bracket 42 and beam 28, extending through the U-bolts 58 that couple bracket 42 to beam 28. In the illustrated embodiment, each side of the vehicle includes a single leaf spring 44. The use of a single leaf spring in combination with spring 46 on either side of the vehicle is advantageous as compared to conventional multiple leaf spring suspensions. In particular, the illustrated suspension has a lower vertical spring rate that provides a softer ride for passengers and cargo.

Springs 46 and shock absorbers 48 are provided to dampen movements between steer axle assembly 12 and frame 10. Springs 46 also absorb a portion of the vertical loads. Springs 46 are conventional in the art and may comprise an air spring. It should be understood, however, that mechanical springs could alternately be used. Springs 46 are disposed between axle beam 28 and frame rails 16, 18. In particular, springs 46 are supported on mounting brackets 42 between opposed spring seats defined by bracket 22 frame 10 and bracket 42 of suspension 14, respectively. Shock absorbers 48 are also conventional in the art. Shock absorbers 48 are coupled at a first end to mounting brackets 42 and at a second end to frame rails 16, 18. Shock absorbers 48 may include eyes at each end configured to receive rod or tubes extending outboard from rails 16, 18 and between the spaced ears 60, 62 of brackets 42.

Arms 50 provide a means for mounting torsion bar 52 to the vehicle. Arms 50 also reduce axle wind-up during braking by transferring some of the braking loads into frame 10 that would otherwise travel into leaf springs 44. Each arm 50 is disposed on a forward side of axle beam 28 relative to the direction of vehicle travel. Each arm 50 extends generally parallel to the longitudinal direction of the vehicle. Each arm 50 is pivotally coupled to frame 10 and beam 28 at its forward and rearward ends 68, 70, respectively, with end 68 coupled to frame 10 proximate the forward end of leaf spring 44 and about a pivot axis that is substantially parallel to the pivot axis of the forward end of leaf spring 44. End 68 of arm 50 is pivotally coupled to bracket 26 of frame 10 in the illustrated embodiment using a conventional fastener and is received between the downwardly extending spaced ears of bracket 26. End 70 of arm 50 is pivotally coupled to a mounting bracket 72 affixed to axle beam 28 on the forward side of axle beam 28. Bracket 72 defines a pair of forwardly and downwardly extending spaced ears sized to receive end 70 of arm 50 and defining coaxial apertures configured to receive a conventional fastener. Each end 68, 70 may include a conventional bushing or other means for enable relative rotation of arm 50 relative to brackets 26, 72. Ends 68, 70 of arm 50 are both located below leaf spring 44 in the illustrated embodiment. End 68 of arm 50 is also vertically higher than end 70 of arm 50. Arm 50 further defines an aperture 74 intermediate ends 68, 70 of arm 50 configured to receive one longitudinal end of torsion bar 52. As shown in FIGS. 1-3, arm 50 may be widest at its connection points ends 68, 70 and aperture 74 to provide sufficient strength to arm 50 while minimizing the weight of arm 50.

Torsion bar 52 is provided to increase the lateral stability and roll stiffness of the vehicle and to reduce axle wind-up during braking. Bar 52 is disposed on a forward side of axle beam 28 and extends substantially parallel to beam 28, transverse to the longitudinal direction of the vehicle. Bar 52 extends between and is coupled to arms 50 on either side of the vehicle. Bar 52 is received within apertures 74 of arms 50. Bar 52 may be tubular. Alternatively, bar 52 may be solid.

Referring now to FIGS. 4-6, a suspension 114 in accordance with another embodiment of the present invention will be described. Suspension 114 includes many of the same components found in suspension 14 and therefore like reference numbers will be used for similar components. Suspension 114 couples steer axle assembly 12 to frame 10. Suspension 114 may include mounting brackets 142, leaf springs 44, air springs 46, shock absorbers 48, mounting arms 150, and a torsion bar 52. Although only one side of the vehicle and suspension 114 are illustrated in FIGS. 4-6, it should again be understood that like components for suspension 114 may be found on the opposite side of the vehicle.

Mounting brackets 142 provide a means for mounting one or more suspension components of suspension 114 to axle beam 28 for use in dampening movements between axle assembly 12 and frame 10. Referring to FIG. 7, brackets 142 are generally rectangular in shape. Each bracket 142 may define multiple grooves 154 in an upper face 156 of the plate that extend transverse to the longitudinal direction of the vehicle and substantially parallel to the longitudinal direction of axle beam 28. Each groove 154 may terminate at either end in a bore that extends vertically through bracket 142. Grooves 154 are configured to receive conventional U-bolts 58 that extend through the bores in bracket 142 and into corresponding bores on beam 28 to couple bracket 142 to beam 28. Although each bracket contains two grooves 154 each configured to receive a U-bolt 58, it should be understood that the number of grooves 154 and U-bolts 58 may vary. Each bracket 42 may further define a pair of rearwardly extending spaced ears 160, 162 having coaxial apertures. Ears 160, 162 are sized to receive one end of arm 150 with the apertures in ears 160, 162 receiving a fastener that extends through arm 150. The upper face 156 of bracket 142 defines a spring seat configured to receive spring 46 and opposing the spring seat formed in mounting bracket 22.

Leaf springs 44 are provided to dampen movement and vibration between frame 10 and steer axle assembly 12. Leaf springs 44 also provide lateral support to the steer axle assembly 12 by transferring lateral loads from the axle beam 28 into mounting brackets 20, 24 of frame 10. Springs 44 are conventional in the art. Each spring 44 extends substantially parallel to rails 16, 18 in the longitudinal direction of the vehicle and is coupled to frame 10 at forward and rearward ends 64, 66 and to beam 28 of steer axle assembly 12 intermediate the forward and rearward ends 64, 66. The forward end 64 is pivotally coupled to bracket 24 and disposed about a pivot axis between the downwardly extending spaced ears at the forward end of bracket 24. The rearward end 66 is coupled to a shackle 167 which is in turn mounted on the pin extending from bracket 20. End 66 is also disposed about a pivot axis. Leaf spring 44 is coupled to beam 28 intermediate ends 64, 66 of leaf spring by bracket 142. In particular, leaf spring 44 is disposed between or sandwiched between bracket 142 and beam 28, extending through the U-bolts 58 that couple bracket 142 to beam 28. In the illustrated embodiment, each side of the vehicle again includes a single leaf spring 44. As set forth above, the use of a single leaf spring in combination with spring 46 on either side of the vehicle is advantageous as compared to conventional multiple leaf spring suspensions. In particular, the illustrated suspension has a lower vertical spring rate that provides a softer ride for passengers and cargo.

Springs 46 and shock absorbers 48 are provided to dampen movements between steer axle assembly 12 and frame 10. Springs 46 are conventional in the art and may comprise an air spring. It should be understood, however, that mechanical springs could alternately be used. Springs 46 are disposed between axle beam 28 and frame rails 16, 18. In particular, springs 46 are supported on mounting bracket 142 between opposed spring seats defined by brackets 22 frame 10 and bracket 142 of suspension 114, respectively. Shock absorbers 48 are also conventional in the art. Shock absorbers 48 are coupled at a first end to mounting brackets 150 and at a second end to frame rails 16, 18. Shock absorbers 48 may include eyes at each end configured to receive rod or tubes extending outboard from rails 16, 18 and arm 150.

Arms 150 provide a means for mounting torsion bar 52 to the vehicle. Arms 150 also reduce axle wind-up during braking by transferring some of the braking loads into frame 10 that would otherwise travel into leaf springs 44. Each arm 150 is disposed on a rearward side of axle beam 28 relative to the direction of vehicle travel. Each arm 150 extends generally parallel to the longitudinal direction of the vehicle. Each arm 150 is pivotally coupled to beam 28 and frame 10 at its forward and rearward ends 168, 170, respectively, with end 170 coupled to frame 10 proximate the rearward end of leaf spring 44 and disposed about a pivot axis extending substantially parallel to the pivot axis of the rearward end of leaf spring 44. End 168 of arm 150 is pivotally coupled to mounting bracket 142 of suspension 114 (which is in turn coupled to axle beam 28) on the rearward side of axle beam 28. In particular, end 168 is received between ears 160, 162 of mounting brackets 148. End 170 of arm 150 is pivotally coupled to shackle 167 (which is in turn coupled to bracket 20 of frame 10) which defines a pair of forwardly extending spaced ears configured to receive end 170 of arm 150. Each end 168, 170 may include a conventional bushing or other means for enable relative rotation of arm 150 relative to bracket 142 and shackle 167. Ends 168, 170 of arm 150 are both located above leaf spring 44 in the illustrate embodiment.

Arm 150 may include multiple members 180, 182. Referring to FIG. 8, member 180 is shown in greater detail. Member 180 may include a relatively straight bar 184 or rod extending between and coupled to two mounting brackets 186, 188 disposed at the ends 168, 170 of arm 150. Bracket 186 may include a bore 190 configured to receive a bushing to allow relative rotation between member 180 and mounting bracket 142 (see FIGS. 4-6). Bracket 186 also include a pair of spaced ears 192, 194 having apertures coaxial with one another and with an aperture formed in bar 184. The spacing between ears 192, 194 and bar 184 is sized so as to receive one eye of shock absorber 48 (best shown in FIGS. 4-6). Bracket 186 also defines an aperture 196 configured to receive a fastener (not shown) by which member 182 is coupled to member 180. Bracket 188 defines a bore 198 configured to receive a bushing to allow relative rotation between member 180 and shackle 167. Bracket 188 also defines an aperture 200 configured to receive a fastener (not shown) by which member 182 is coupled to member 180.

Referring again to FIGS. 4-6, member 182 is generally V-shaped in a side view. Member 182 is rigidly coupled to member 180 at its forward and rearward ends by fasteners (not shown) extending through apertures in member 182 that are aligned with apertures 196, 200 in brackets 186, 188 of member 180. It should be understood, however, that members 180, 182 may be formed as a one-piece, unitary construction. Member 182 is coupled to member 180 at its forward and rearward ends at locations above leaf spring 44. Member 182 further defines an aperture 174 intermediate ends 168, 170 of arm 150 configured to receive one longitudinal end of torsion bar 52. Aperture 174 may be disposed below leaf spring 44. As shown in FIGS. 4-6, member 182 may be widest at its connection points to member 180 and at aperture 174 to provide sufficient strength to arm 150 while minimizing the weight of arm 150.

Torsion bar 52 is provided to increase the lateral stability and roll stiffness of the vehicle and to reduce axle wind-up during braking. Bar 52 is disposed on a forward side of axle beam 28 and extends substantially parallel to beam 28, transverse to the longitudinal direction of the vehicle. Bar 52 extends between and is coupled to arms 150 on either side of the vehicle. Bar 52 is received within apertures 174 of arms 150. Bar 52 may be tubular. Alternatively, bar 52 may be solid.

Figure 10:
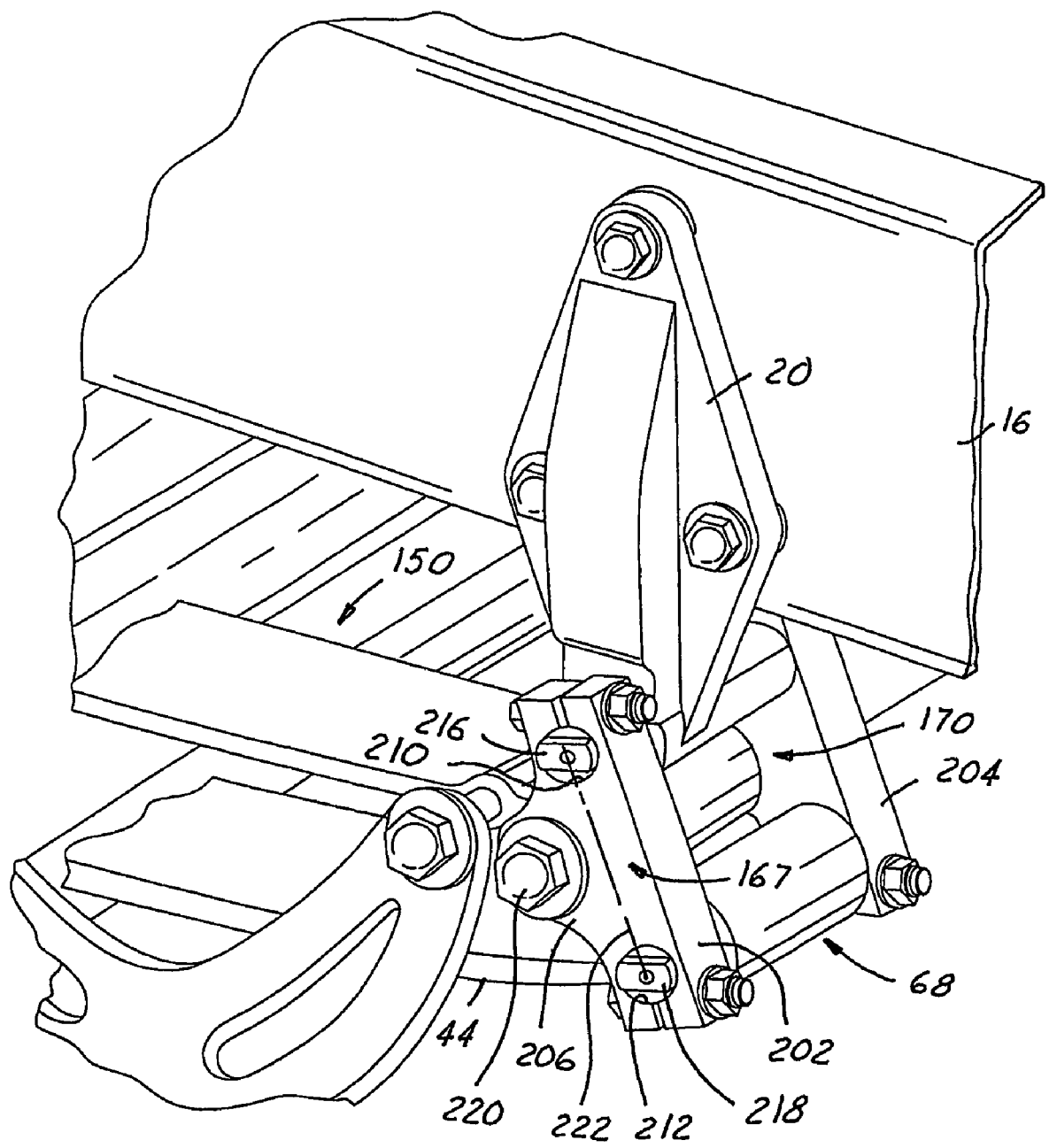

Referring now to FIGS. 9-10, shackle 167 will be described in greater detail. Shackle 167 is provided to pivotally couple one end of leaf spring 44 and one end of arm 150 to frame 10. Shackle 167 couples leaf spring 44 and arm 150 in such a manner that the pivot axes of leaf spring 44 and arm 150 are substantially parallel to one another. Shackle 167 may include a pair of spaced members 202, 204. Each of members 202, 204 may be substantially rectangular in shape while defining forward projecting spaced ears 206, 208 configured to receive end 170 of arm 150. Members 202, 204 may define several pairs of aligned apertures 210, 212, 214. Apertures 210 are configured to receive a fastener 216 coupling shackle 167 to frame 10. Apertures 212 are configured to receive a fastener 218 extending through end 66 of leaf spring 44. Finally, apertures 214 are configured to receive a fastener 220 extending through end 170 of arm 150. Fasteners 216, 218, 220 may comprise bolts or pins or other conventional fasteners. Ears 206, 208 and apertures 214 may be disposed on one side of a line 222 connecting apertures 210, 212 such that ears 206, 208 project forward and apertures 214 are nearer axle beam 28 than apertures 210, 212. Ears 206, 208 and apertures 214 may also be located such that apertures 214 are vertically above apertures 212 and vertically below apertures 212.

A suspension 14 or 114 in accordance with the present invention is advantageous. Arms 50 or 150 reduce axle wind-up during braking by transferring some of the braking loads into the vehicle frame 10 that would otherwise travel into the leaf springs 44. The use of a torsion bar 52 in some embodiments of suspension 14 or 114 also provides lateral stability and roll stiffness to the vehicle and also reduces axle wind-up during braking and the mounting arrangement for torsion bar 52 enables these benefits to be achieved without hindering vertical movement of the axle and creating undue stress on other suspension components.

While the invention has been shown and described with reference to one or more particular embodiments thereof, it will be understood by those of skill in the art that various changes and modifications can be made without departing from the spirit and scope of the invention.

I claim:

1. A suspension for coupling a steer axle assembly to a vehicle frame having first and second longitudinal frame rails, comprising:

a first leaf spring coupled to said vehicle frame at first and second ends and to an axle beam of said steer axle assembly intermediate said first and second ends;

a first arm pivotally coupled to said axle beam at a first end and to said vehicle frame at a second end proximate one of said first and second ends of said first leaf spring;

a second leaf spring coupled to said vehicle frame at first and second ends and to said axle beam of said steer axle assembly intermediate said first and second ends, said second leaf spring disposed on an opposite side of said vehicle frame from said first leaf spring; and, a second arm pivotally coupled to said axle beam at a first end and to said vehicle frame at a second end proximate one of said first and second ends of said second leaf spring further comprising:

a first shackle coupled to said vehicle frame, one of said first and second ends of said first leaf spring pivotally coupled to said first shackle and said second end of said first arm pivotally coupled to said first shackle; and, a second shackle coupled to said vehicle frame, one of said first and second ends of said second leaf spring pivotally coupled to said second shackle and said second end of said second arm pivotally coupled to said second shackle.

2. The suspension of claim 1, further comprising a torsion bar extending between and coupled to said first and second arms.

3. The suspension of claim 2 wherein said torsion bar is tubular.

4. The suspension of claim 1, further comprising first and second mounting brackets coupled to said axle beam, said first leaf spring disposed between said first mounting bracket and said axle beam and said second leaf spring disposed between said second mounting bracket and said axle beam.

5. The suspension of claim 4, further comprising first and second springs disposed between said axle beam and said first and second longitudinal frame rails, said first and second springs supported on said first and second mounting brackets, respectively.

6. The suspension of claim 1, further comprising first and second springs disposed between said axle beam and said first and second longitudinal frame rails.

7. The suspension of claim 1 wherein said first and second ends of said first and second arms are disposed below said first and second leaf springs, respectively.

8. A suspension for coupling a steer axle assembly to a vehicle frame having first and second longitudinal frame rails, comprising:

a first leaf spring coupled to said vehicle frame at first and second ends and to an axle beam of said steer axle assembly intermediate said first and second ends;

a first arm pivotally coupled to said axle beam at a first end and to said vehicle frame at a second end proximate one of said first and second ends of said first leaf spring;

a second leaf spring coupled to said vehicle frame at first and second ends and to said axle beam of said steer axle assembly intermediate said first and second ends, said second leaf spring disposed on an opposite side of said vehicle frame from said first leaf spring; and, a second arm pivotally coupled to said axle beam at a first end and to said vehicle frame at a second end proximate one of said first and second ends of said second leaf spring wherein said first and second ends of said first and second arms are disposed above said first and second leaf springs, respectively.

9. A suspension for coupling a steer axle assembly to a vehicle frame having first and second longitudinal frame rails, comprising:

a first leaf spring coupled to said vehicle frame at a forward end and at a rearward end and to an axle beam of said steer axle assembly intermediate said forward and rearward ends;

a first arm pivotally coupled to said axle beam at a rearward end and to said vehicle frame at a forward end proximate said forward end of said first leaf spring, said forward and rearward ends of said first arm disposed below said first leaf spring;

a second leaf spring coupled to said vehicle frame at a forward end and at a rearward end and to said axle beam of said steer axle assembly intermediate said forward and rearward ends, said second leaf spring disposed on an opposite side of said vehicle frame from said first leaf spring; and, a second arm pivotally coupled to said axle beam at a rearward end and to said vehicle frame at a forward end proximate said forward end of said second leaf spring, said forward and rearward ends of said second arm disposed below said second leaf spring further comprising a first mounting bracket coupled to said axle beam, said first leaf spring disposed between said first mounting bracket and said axle beam a first shock absorber, said first shock absorber coupled at a first end to said first mounting bracket and at a second end to said first longitudinal frame rail.

10. The suspension of claim 9, further comprising a torsion bar extending between and coupled to said first and second arms.

11. The suspension of claim 10 wherein said first arm defines an aperture configured to receive said torsion bar.

12. The suspension of claim 10 wherein said torsion bar is tubular.

13. The suspension of claim 9 wherein said forward end of said first arm is vertically higher than said rearward end of said first arm.

14. The suspension of claim 9, further comprising first and second springs disposed between said axle beam and said first and second longitudinal frame rails.

15. A suspension for coupling a steer axle assembly to a vehicle frame having first and second longitudinal frame rails, comprising:

a first leaf spring coupled to said vehicle frame at a forward end and at a rearward end and to an axle beam of said steer axle assembly intermediate said forward and rearward ends;

a first arm pivotally coupled to said axle beam at a forward end and to said vehicle frame at a rearward end proximate said rearward end of said first leaf spring, said forward and rearward ends of said first arm disposed above said first leaf spring;

a second leaf spring coupled to said vehicle frame at a forward end and at a rearward end and to said axle beam of said steer axle assembly intermediate said forward and rearward ends, said second leaf spring disposed on an opposite side of said vehicle frame from said first leaf spring; and, a second arm pivotally coupled to said axle beam at a forward end and to said vehicle frame at a rearward end proximate said rearward end of said second leaf spring, said forward and rearward ends of said second arm disposed above said second leaf spring further comprising a torsion bar extending between and coupled to said first and second arms.

16. The suspension of claim 15 wherein said first arm defines an aperture configured to receive said torsion bar.

17. The suspension of claim 15 wherein said torsion bar is tubular.

18. The suspension of claim 15 wherein said first arm includes a first member disposed above said first leaf spring and a second member having first and second ends rigidly coupled to said first member at locations above said first leaf spring and defining an aperture intermediate said first and second ends and below said first leaf spring, said aperture configured to receive said torsion bar.

19. A suspension for coupling a steer axle assembly to a vehicle frame having first and second longitudinal frame rails, comprising:
   a first leaf spring coupled to said vehicle frame at a forward end and at a rearward end and to an axle beam of said steer axle assembly intermediate said forward and rearward ends;
   a first arm pivotally coupled to said axle beam at a forward end and to said vehicle frame at a rearward end proximate said rearward end of said first leaf spring, said forward and rearward ends of said first arm disposed above said first leaf spring;
   a second leaf spring coupled to said vehicle frame at a forward end and at a rearward end and to said axle beam of said steer axle assembly intermediate said forward and rearward ends, said second leaf spring disposed on an opposite side of said vehicle frame from said first leaf spring; and,
   a second arm pivotally coupled to said axle beam at a forward end and to said vehicle frame at a rearward end proximate said rearward end of said second leaf spring, said forward and rearward ends of said second arm disposed above said second leaf spring
   further comprising a first shock absorber, said first shock absorber coupled at a first end to said first arm and at a second end to said first longitudinal frame rail.

20. A suspension for coupling a steer axle assembly to a vehicle frame having first and second longitudinal frame rails, comprising:
   a first leaf spring coupled to said vehicle frame at a forward end and at a rearward end and to an axle beam of said steer axle assembly intermediate said forward and rearward ends;
   a first arm pivotally coupled to said axle beam at a forward end and to said vehicle frame at a rearward end proximate said rearward end of said first leaf spring, said forward and rearward ends of said first arm disposed above said first leaf spring;
   a second leaf spring coupled to said vehicle frame at a forward end and at a rearward end and to said axle beam of said steer axle assembly intermediate said forward and rearward ends, said second leaf spring disposed on an opposite side of said vehicle frame from said first leaf spring; and,
   a second arm pivotally coupled to said axle beam at a forward end and to said vehicle frame at a rearward end proximate said rearward end of said second leaf spring, said forward and rearward ends of said second arm disposed above said second leaf spring
   further comprising:
   a first shackle coupled to said vehicle frame, one of said first and second ends of said first leaf spring pivotally coupled to said first shackle and said second end of said first arm pivotally coupled to said first shackle; and,
   a second shackle coupled to said vehicle frame, one of said first and second ends of said second leaf spring pivotally coupled to said second shackle and said second end of said second arm pivotally coupled to said second shackle.

21. The suspension of claim 20, further comprising a first mounting bracket coupled to said axle beam, said first leaf spring disposed between said first mounting bracket and said axle beam.

22. The suspension of claim 21 wherein said first arm is pivotally coupled to said first mounting bracket.

23. The suspension of claim 20, further comprising first and second springs disposed between said axle beam and said first and second longitudinal frame rails.

* * * * *